United States Patent
Kim et al.

(10) Patent No.: US 11,002,329 B2
(45) Date of Patent: May 11, 2021

(54) RESIN COMPOSITION FOR BRAKE PAD FRICTION MATERIALS AND BRAKE PAD FRICTION MATERIALS MADE OF THE RESIN COMPOSITION

(71) Applicant: LG CHEM, LTD., Seoul (KR)

(72) Inventors: Sang Woo Kim, Daejeon (KR); Yulliana Kim, Daejeon (KR); Youngdae Kim, Daejeon (KR); Seunghee Lee, Daejeon (KR); Kiho Ahn, Daejeon (KR)

(73) Assignee: LG CHEM, LTD, Seoul (KR)

( * ) Notice: Subject to any disclaimer, the term of this patent is extended or adjusted under 35 U.S.C. 154(b) by 0 days.

(21) Appl. No.: 16/468,901

(22) PCT Filed: May 21, 2018

(86) PCT No.: PCT/KR2018/005791
§ 371 (c)(1),
(2) Date: Jun. 12, 2019

(87) PCT Pub. No.: WO2018/216986
PCT Pub. Date: Nov. 29, 2018

(65) Prior Publication Data
US 2020/0080610 A1 Mar. 12, 2020

(30) Foreign Application Priority Data

May 22, 2017 (KR) .................. 10-2017-0063090
May 17, 2018 (KR) .................. 10-2018-0056587

(51) Int. Cl.
*F16D 69/02* (2006.01)
*C08K 3/013* (2018.01)
(Continued)

(52) U.S. Cl.
CPC ............ *F16D 69/02* (2013.01); *C08G 73/10* (2013.01); *C08K 3/013* (2018.01); *C08K 3/041* (2017.05); *C08K 3/042* (2017.05); *C08K 3/14* (2013.01); *C08K 3/2279* (2013.01); *C08K 3/26* (2013.01); *C08K 3/30* (2013.01); *C08K 7/14* (2013.01); *C08L 33/18* (2013.01);
(Continued)

(58) Field of Classification Search
None
See application file for complete search history.

(56) References Cited

U.S. PATENT DOCUMENTS 4,408,035 A 10/1983 Keller
5,003,039 A 3/1991 Keller
(Continued)

FOREIGN PATENT DOCUMENTS

CN 102504252 A 6/2012
CN 103012790 A 4/2013
(Continued)

*Primary Examiner* — Peter A Salamon
(74) *Attorney, Agent, or Firm* — Dentons US LLP (57) ABSTRACT

The present invention relates to a resin composition, and a brake pad friction material made of the resin composition. The resin composition according to the present invention has high heat resistance and excellent processability, and thus enables the preparation of a brake pad friction material that is capable of securing improved durability and stable brake performance.

8 Claims, 4 Drawing Sheets (51) Int. Cl.
  *C08K 3/04* (2006.01)
  *C08G 73/10* (2006.01)
  *C08K 3/14* (2006.01)
  *C08K 3/22* (2006.01)
  *C08K 3/26* (2006.01)
  *C08K 3/30* (2006.01)
  *C08K 7/14* (2006.01)
  *C08L 33/18* (2006.01)

(52) U.S. Cl.
  CPC ............... *C08K 2003/2227* (2013.01); *C08K 2003/2244* (2013.01); *C08K 2003/265* (2013.01); *C08K 2003/3045* (2013.01)

(56) References Cited

U.S. PATENT DOCUMENTS

| | | | |
|---|---|---|---|
| 5,003,078 A * | 3/1991 | Keller | C07D 209/48 548/406 |
| 5,004,801 A | 4/1991 | Keller et al. | |
| 5,132,396 A | 7/1992 | Keller | |
| 5,139,054 A | 8/1992 | Long et al. | |
| 5,208,318 A | 5/1993 | Keller | |
| 5,237,045 A | 8/1993 | Burchill et al. | |
| 5,247,060 A | 9/1993 | Keller | |
| 5,292,854 A | 3/1994 | Keller | |
| 5,350,828 A | 9/1994 | Keller et al. | |
| 6,001,926 A | 12/1999 | Sastri et al. | |
| 2007/0187381 A1 | 8/2007 | Vontell et al. | |
| 2008/0124222 A1 | 5/2008 | Vontell et al. | |
| 2014/0225310 A1 | 8/2014 | Yaguchi et al. | |
| 2016/0069408 A1 | 3/2016 | Hattori et al. | |
| 2017/0002146 A1 * | 1/2017 | Keller | D01F 1/10 |
| 2018/0346646 A1 | 12/2018 | Kim et al. | |
| 2020/0080610 A1 * | 3/2020 | Kim | C08K 3/14 |

FOREIGN PATENT DOCUMENTS

| | | | |
|---|---|---|---|
| CN | 105219138 A * | 1/2016 | |
| CN | 106632274 A | 5/2017 | |
| CN | 209294293 U | 8/2019 | |
| EP | 0745781 B1 | 3/2004 | |
| EP | 3211023 A1 | 8/2017 | |
| JP | 04-014159 B2 | 3/1992 | |
| JP | 2007-231942 A | 9/2007 | |
| KR | 10-0558158 B1 | 2/2006 | |
| KR | 10-2007-0018159 A | 2/2007 | |
| KR | 10-2009-0019982 A | 2/2009 | |
| KR | 10-2010-0031995 A | 3/2010 | |
| KR | 10-2011-0028187 A | 3/2011 | |
| KR | 10-2013-0033297 A | 4/2013 | |
| KR | 10-2015-0138460 A | 12/2015 | |
| KR | 10-2016-0009014 A | 1/2016 | |
| KR | 10-2016-0115543 A | 10/2016 | |
| KR | 10-2017-0065954 A | 6/2017 | |
| WO | 9917928 A1 | 4/1999 | |
| WO | 02/08150 A2 | 1/2002 | |
| WO | 2016-064298 A | 4/2016 | |
| WO | 2016/080762 A1 | 5/2016 | |

* cited by examiner

RESIN COMPOSITION FOR BRAKE PAD FRICTION MATERIALS AND BRAKE PAD FRICTION MATERIALS MADE OF THE RESIN COMPOSITION

The present application is a National Phase entry pursuant to 35 U.S.C. § 371 of International Application No. PCT/KR2018/005791 filed on May 21, 2018, and claims priority to and the benefit of Korean Patent Application No. 10-2017-0063090 filed on May 22, 2017 and Korean Patent Application No. 10-2018-0056587 filed on May 17, 2018, the disclosures of each of the above incorporated herein by reference in their entireties.

FIELD

The present invention relates to a resin composition for a brake pad friction material, and brake pad friction material made of the resin composition.

BACKGROUND

In general, a brake or a brake system means a device that applies friction to an object running or rotating at high speed to stop it by frictional force. An automobile is equipped with a brake system for control of running speed, and in the brake system, a brake pad that contacts a friction surface under the control of a driver is installed.

Under normal braking conditions, even if heat of predetermined temperature is generated in a brake pad, the brake pad is not significantly damaged. However, under a continuous high speed or downhill conditions, the generation of heat by friction increases.

For example, under common running conditions, heat of about 100 to 200° C. is generated in a brake pad, but during downhill running, frictional heat may increase to a temperature exceeding 1000° C. Such heat generation in a brake pad may induce a phenomenon in which a rapid decrease in a coefficient of friction is generated, thus causing significant problems in terms of safety.

In general, a composition including a filler, a reinforcing agent, and a binder resin is used to prepare brake pad friction materials, and among them, the binder resin is a material having relatively low heat resistance.

In general, as the binder resin, a phenol resin, an acryl rubber modified phenol resin, an NBR (nitrile butadiene rubber) modified phenol resin, a melamine resin, an epoxy resin, an acryl rubber, etc. are used. However, most binder resins do not have heat resistance exceeding 150° C., and thus, there is a limitation in that the reliability and running safety of brake pad friction materials cannot be assured in extreme situations.

SUMMARY

It is an object of the present invention to provide a resin composition for a brake pad friction material having high heat resistance and excellent processability.

It is another object of the present invention to provide a brake pad friction material that is made of the resin composition and thus can secure improved durability and stable brake performance.

DETAILED DESCRIPTION

According to the present invention, a resin composition for a brake pad friction material including a resin binder cured from a composition containing a phthalonitrile compound, a reinforcing fiber, a filler, an abrasive, and a lubricant, is provided.

Further, according to the present invention, a brake pad friction material made of the resin composition is provided.

Hereinafter, a resin composition for a brake pad friction material and a brake pad friction material made of the resin composition according to the embodiments of the invention will be explained in detail.

Technical terms in the present specification are only for explaining specific embodiments, and they are not intended to restrict the present invention unless there is a particular mention about them.

Singular expressions used herein may include plural expressions unless they are differently expressed contextually.

The meaning of the term "comprise" used in the specification embodies specific characteristics, areas, essences, steps, actions, elements, and/or components, and does not exclude existence or addition of other specific characteristics, areas, essences, steps, actions, elements, components, and/or groups.

I. Resin Composition for Brake Pad Friction Material

According to one embodiment of the invention, a resin composition for a brake pad friction material including a resin binder cured from a composition containing a phthalonitrile compound, a reinforcing fiber, a filler, an abrasive, and a lubricant, is provided.

As the result of continuous studies, the present inventors confirmed that if a resin binder cured from a composition containing a phthalonitrile compound is applied as a resin composition for a brake pad friction material, a brake pad friction material that can not only exhibit excellent processability, but also secure improved heat resistance and stable brake performance, can be provided.

Particularly, since the resin composition for a brake pad friction material provided in the present invention includes the resin binder, it can minimize thermal decomposition or thermal damage of the brake pad friction material due to frictional heat, thus enabling improvement in durability and lifespan, and securing stable brake performance of the brake pad friction material.

Hereinafter, the components that can be included in the resin composition for a brake pad friction material will be explained in more detail.

The resin composition for a brake pad friction material includes a resin binder cured from a composition containing a phthalonitrile compound.

The resin binder is added so as to afford moldability to the resin composition for a brake pad friction material and stably fix additives to the brake pad friction material. The additives are components including a reinforcing fiber, a filler, an abrasive, and a lubricant, included in the resin composition for a brake pad friction material.

The resin composition for a brake pad friction material is provided in a state wherein the additives are dispersed in a matrix of the resin binder.

The resin binder enables the preparation of a brake pad friction material by an easy process like the conventional thermosetting or thermoplastic resin binder, without requiring a complicated process, as compared to the existing polyimide resin having high heat resistance.

The resin binder is a compound cured from a composition containing a phthalonitrile compound, and it may be a mixture of a phthalonitrile compound and a curing agent, or a prepolymer formed by reaction of the mixture.

The prepolymer state is a state wherein the reaction of the phthalonitrile compound and curing agent has occurred to some degree in the resin composition for a brake pad friction material (for example, the polymerization of an A or B stage has occurred), but a completely polymerized state has not yet been reached, so appropriate flowability is exhibited, and thus it is possible to process the brake pad friction materials described below, for example.

Further, the prepolymer state corresponds to a state wherein the polymerization of the polymerizable composition has progressed to some degree, and it may mean a state wherein the melting viscosity measured in the range of about 150° C. to 250° C. is 100 Pas to 50,000 Pas, 100 Pas to 10,000 Pas, or 100 Pas to 5000 Pas. Thus, the prepolymer may also exhibit excellent curability, a low melting temperature, and a wide process window, like the resin composition for a brake pad friction material.

For example, the process temperature of the prepolymer may be 150° C. to 350° C. The process temperature means a temperature at which the prepolymer exists in a processable state. Such a process temperature may be, for example, a melting temperature (Tm) or a glass transition temperature (Tg). In this case, the process window of the prepolymer, i.e., the absolute value of a difference (Tc–Tp) between the process temperature (Tp) and the curing temperature (Tc) of the prepolymer, may be 30° C. or more, 50° C. or more, or 100° C. or more.

For example, the curing temperature (Tc) may be higher than the process temperature (Tp). Such a range may be advantageous for securing appropriate processability during the process of preparing brake pad friction materials described below, using the prepolymer. The upper limit of the process window is not specifically limited, but for example, the absolute value of a difference (Tc–Tp) between the process temperature (Tp) and the curing temperature (Tc) may be 400° C. or less or 300° C. or less.

Meanwhile, the kind of the phthalonitrile compound that can be applied for the resin binder is not specifically limited, but for example, as the phthalonitrile compound, a compound including 2 or more, 2 to 20, 2 to 16, 2 to 12, 2 to 8, or 2 to 4 phthalonitrile structures capable of forming the phthalonitrile resin through the reaction with the curing agent may be used.

There are various compounds known to be suitable for the formation of the phthalonitrile resin, and in the present invention, all the known compounds may be used. For example, compounds described in U.S. Pat. Nos. 4,408,035, 5,003,039, 5,003,078, 5,004,801, 5,132,396, 5,139,054, 5,208,318, 5,237,045, 5,292,854, 5,350,828, etc. may be mentioned, and besides those described in the documents, various compounds known in the art may be included.

Further, the resin binder may be formed by curing of the composition containing a phthalonitrile compound by one or more curing agents selected from the group consisting of an amine-based compound, a hydroxy-based compound, and an imide-based compound. The amine-based compound, hydroxyl-based compound, and imide-based compound respectively mean a compound including at least one amino group, hydroxyl group, and imide group in the molecule.

Preferably, the curing agent may be a compound represented by the following Chemical Formula 1:

[Chemical Formula 1]

wherein, in Chemical Formula 1,

M is a tetravalent radical derived from an aliphatic, alicyclic, or aromatic compound, each of $X^1$ and $X^2$ is independently an alkylene group, an alkylidene group, or a divalent radical derived from an aromatic compound, and n is a number that is equal to or greater than 1.

Such an imide-based compounds represented by Chemical Formula 1 afford excellent heat resistance to the resin binder because they include an imide structure in the molecule, and thus, even if the resin composition for a brake pad friction material is processed or cured at a high temperature, it does not induce defects such as voids that may have a negative influence on the properties.

In Chemical Formula 1, M may be a tetravalent radical derived from an aliphatic, alicyclic, or aromatic compound, and it may have a structure wherein radicals formed by dehydrogenation of 4 hydrogen atoms in a molecule of the aliphatic, alicyclic, or aromatic compound are respectively connected with the carbon atoms of the carbonyl group of Chemical Formula 1.

As the aliphatic compound, a linear or branched alkane, alkene, or alkyne may be mentioned. As the aliphatic compound, a C2-20, C2-16, C2-12, C2-8, or C2-4 alkane, alkene, or alkyne may be used. The alkane, alkene, or alkyne may be optionally substituted with one or more substituents.

As the alicyclic compound, hydrocarbon compounds including C3-20, C3-16, C3-12, C3-8, or C3-4 nonaromatic ring structures may be mentioned. Such an alicyclic hydrocarbon compound may include at least one heteroatom such as oxygen or nitrogen as a ring member, and if necessary, it may be optionally substituted with one or more substituents.

Further, as the aromatic compound, benzene, benzene-containing compounds, or derivatives thereof may be mentioned. The benzene-containing compound means compounds wherein two or more benzene rings are condensed while sharing one or two or more carbon atoms, or being directly connected or connected by an appropriate linker.

As the linker used to connect two benzene rings, an alkylene group, an alkylidene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, -$L^6$-$Ar^1$-$L^7$-$Ar^2$-$L^8$-, etc. may be mentioned. Each of $L^1$ to $L^8$ may independently be a single bond, —O—, an alkylene group, or an alkylidene group, and each of $Ar^1$ and $Ar^2$ may independently be an arylene group.

The aromatic compound may include, for example, 6 to 30, 6 to 28, 6 to 27, 6 to 25, 6 to 20, or 6 to 12 carbon atoms, and if necessary, may be substituted with one or more substituents. If the aromatic compound includes the above-explained linker, the number of carbon atoms of the aromatic compound is a number including the carbon atom existing in the linker.

Specifically, for example, in Chemical Formula 1, M may be a tetravalent radical derived from an alkane, alkene, or alkyne, or a tetravalent radical derived from the compound represented by any one of the following Chemical Formulas 2 to 7:

[Chemical Formula 2]

wherein, in Chemical Formula 2, each of $R^1$ to $R^6$ is independently hydrogen, an alkyl group, an alkoxy group, or an aryl group,

[Chemical Formula 3]

wherein, in Chemical Formula 3, each of $R^1$ to $R^8$ is independently hydrogen, an alkyl group, an alkoxy group, or an aryl group, and

[Chemical Formula 4]

wherein, in Chemical Formula 4,
each of $R^1$ to $R^{10}$ is independently hydrogen, an alkyl group, an alkoxy group, or an aryl group,
X is a single bond, an alkylene group, an alkylidene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, or -$L^6$-$Ar^1$-$L^7$-$Ar^2$-$L^8$-, each of $L^1$ to $L^8$ is independently a single bond, —O—, an alkylene group, or an alkylidene group, and each of $Ar^1$ and $Ar^2$ is independently an arylene group.

Here, the single bond means that an atom does not exist at that part. Thus, in Chemical Formula 4, if X is a single bond, it means that an atom does not exist at a part indicated by X, and in this case, the benzene rings of both sides of X may be directly connected to form a biphenyl structure.

Among the X in Chemical Formula 4, in —C(=O)—O-$L^1$-O—C(=O)—, -$L^2$-C(=O)—O-$L^3$-, or -$L^4$-O—C(=O)-$L^5$-, each of $L^1$ to $L^5$ may independently be a C1-12, C1-8, or C1-4 alkylene group or alkylidene group, and the alkylene group or alkylidene group may be substituted or unsubstituted.

Further, among the X in Chemical Formula 4, in -$L^6$-$Ar^1$-$L^7$-$Ar^2$-$L^8$-, $L^6$ and $L^8$ may be —O—, $L^7$ may be a C1-12, C1-8, or C1-4 alkylene group or alkylidene group, and the alkylene group or alkylidene group may be substituted or unsubstituted. $Ar^1$ and $Ar^2$ may be a phenylene group, and in this case, on the basis of $L^7$, each of $L^6$ and $L^8$ may be connected at the ortho, meta, or para position of the phenylene.

[Chemical Formula 5]

wherein, in Chemical Formula 5,
each of $R^1$ to $R^4$ is independently hydrogen, an alkyl group, or an alkoxy group, and two of $R^1$ to $R^4$ may be connected to each other to form an alkylene group, and
A is an alkylene group or an alkenylene group, and the alkylene group or alkenylene group may include one or more oxygen atoms as a heteroatom,

[Chemical Formula 6]

wherein, in Chemical Formula 6, each of $R^1$ to $R^4$ is independently hydrogen, an alkyl group, or an alkoxy group, and A is an alkylene group, and

[Chemical Formula 7]

wherein, in Chemical Formula 7, each of $R^1$ to $R^{10}$ is independently hydrogen, an alkyl group, or an alkoxy group.

The tetravalent radical derived from the compound represented by any one of Chemical Formulas 2 to 7 may be formed by directly eliminating the substituents $R^1$ to $R^{10}$ of Chemical Formulas 2 to 7, or may be formed by dehydrogenation of the hydrogen atom of the alkyl group, alkoxy group, aryl group, alkylene group, or alkenylene group that may exist in $R^1$ to $R^{10}$.

For example, if the tetravalent radical is derived from the compound of Chemical Formula 3, one or more, two or more, three or more, or four of $R^1$ to $R^6$ of Chemical

Formula 3 may form a radical, or hydrogen atoms of the alkyl group, alkoxy group, or aryl group existing in $R^1$ to $R^6$ may leave to form a radical. The formation of a radical means that the part is connected to the carbon atom of the carbonyl group of Chemical Formula 1, as explained above.

Further, if the tetravalent radical is derived from the compound of Chemical Formula 4, each of $R^1$ to $R^{10}$ is independently hydrogen, an alkyl group, an alkoxy group, or an aryl group, and one or more, two or more, three or more, or four of $R^1$ to $R^{10}$ may form a radical connected to Chemical Formula 1. Each of $R^1$ to $R^{10}$ that does not form a radical may be hydrogen, an alkyl group, or an alkoxy group, or may be hydrogen or an alkyl group. For example, in Chemical Formula 4, two of $R^7$ to $R^9$ and two of $R^2$ to $R^4$ may form the radical, and other substituents may independently be hydrogen, an alkyl group, an alkoxy group, or an aryl group, may be hydrogen, an alkyl group, or an alkoxy group, or may be hydrogen or an alkyl group.

More specifically, for example, the compounds represented by Chemical Formula 2 may be benzene, 1,2,4,5-tetraalkylbenzene, etc., but is not limited thereto.

In addition, the compounds represented by Chemical Formula 4 may be biphenyl, or the compound represented by any one of the following Chemical Formulas A to F, but is not limited thereto.

[Chemical Formula A]

[Chemical Formula B]

[Chemical Formula C]

[Chemical Formula D]

[Chemical Formula E]

[Chemical Formula F]

Further, the compounds represented by Chemical Formula 5 may be a C4-8 cycloalkane such as cyclohexane, etc., a C4-8 cycloalkene such as cyclohexene that may be substituted with one or more alkyl groups, etc., or a compound represented by any one of the following Chemical Formulas G to I, but is not limited thereto.

[Chemical Formula G]

[Chemical Formula H]

[Chemical Formula I]

The compounds represented by Chemical Formula 6 may be compounds represented by the following Chemical Formula J, or compounds represented by the following Chemical Formula J, at least one hydrogen of which is substituted with an alkyl group, but is not limited thereto.

[Chemical Formula J]

In Chemical Formula 1, each of $X^1$ and $X^2$ may independently be a divalent radical derived from an aromatic compound. For example, each of $X^1$ and $X^2$ may independently be a divalent radical derived from a C6-40 aromatic compound. The divalent radical derived from an aromatic compound may be a divalent radical derived from the above-explained aromatic compounds.

Specifically, for example, each of $X^1$ and $X^2$ may independently be a divalent radical derived from the compound represented by any one of the following Chemical Formulas 8 to 10:

[Chemical Formula 8]

wherein, in Chemical Formula 8, each of $R^{11}$ to $R^{16}$ is independently hydrogen, an alkyl group, an alkoxy group, an aryl group, a hydroxy group, or a carboxyl group,

[Chemical Formula 9]

wherein, in Chemical Formula 9,
each of $R^{11}$ to $R^{20}$ is independently hydrogen, an alkyl group, an alkoxy group, an aryl group, a hydroxy group, or a carboxyl group,
X' is a single bond, an alkylene group, an alkylidene group, —O—, —S—, —C(=O)—, —$NR^{21}$—, —S(=O)—, —S(=O)$_2$—, -$L^9$-$Ar^3$-$L^{10}$-, or -$L^{11}$-$Ar^4$-$L^{12}$-$Ar^5$-$L^{13}$, $R^{21}$ is hydrogen, an alkyl group, an alkoxy group, or an aryl group, each of $L^9$ to $L^{13}$ is independently a single bond, —O—, an alkylene group, or an alkylidene group, and each of $Ar^3$ to $Ar^5$ is independently an arylene group, and

[Chemical Formula 10]

wherein, in Chemical Formula 10, each of $R^{11}$ to $R^{20}$ is independently hydrogen, an alkyl group, an alkoxy group, an aryl group, a hydroxy group, or a carboxyl group.

The divalent radical derived from the compound represented by any one of Chemical Formulas 8 to 10 may be formed by directly eliminating the substituents $R^{11}$ to $R^{20}$ of Chemical Formulas 8 to 10, or may be formed by dehydrogenation of the hydrogen atom of the alkyl group, alkoxy group, aryl group, alkylene group, or alkenylene group that may exist in $R^{11}$ to $R^{20}$.

For example, if the divalent radical is derived from the compound of Chemical Formula 8, for example, phenylene, the substitution position of the amine group on the basis of a part connected to N at $X^1$ of Chemical Formula 1 may be ortho, meta, or para, and the substitution position of the amine group on the basis of a part connected to N at $X^2$ of Chemical Formula 1 may be also ortho, meta, or para.

If the divalent radical is derived from the compound of Chemical Formula 9, one of $R^7$ to $R^9$ of Chemical Formula 9 and one of $R^2$ to $R^4$ of Chemical Formula 9 may form a radical connected to the nitrogen atom of Chemical Formula 1. Other substituents excluding the substituents forming radicals may independently be hydrogen, an alkyl group, an alkoxy group, or an aryl group, hydrogen, an alkyl group, or an alkoxy group, or hydrogen or an alkyl group.

More specifically, the compound represented by Chemical Formula 8 may be benzene that may be substituted with at least one hydroxyl group or carboxyl group, but is not limited thereto.

The compounds represented by Chemical Formula 9 may be biphenyl that may be substituted with at least one hydroxyl group or carboxyl group, compounds represented by any one of Chemical Formulas A to F, which may be substituted with at least one hydroxyl group or carboxyl group, or compounds represented by the following Chemical Formula K or M, which may be substituted with at least one hydroxyl group or carboxyl group, but is not limited thereto.

[Chemical Formula K]

[Chemical Formula L]

[Chemical Formula M]

The compound represented by Chemical Formula 9 may be a compound represented by the following Chemical Formula N, or a compound represented by the following Chemical Formula N, at least one hydrogen of which is substituted with a hydroxyl group or a carboxyl group, but is not limited thereto:

[Chemical Formula N]

Throughout the specification, the alkyl group may be a C1-20, C1-16, C1-12, C1-8, or C1-4 alkyl group, unless otherwise described. The alkyl group may be linear, branched, or cyclic, and if necessary, may be substituted with one or more substituents.

The alkoxy group may be a C1-20, C1-16, C1-12, C1-8, or C1-4 alkoxy group, unless otherwise described. The alkoxy group may be linear, branched, or cyclic, and if necessary, may be substituted with one or more substituents.

The aryl group means a monovalent residue derived from the above-described aromatic compound, unless otherwise described.

The alkylene group and alkylidene group may be a C1-20, C1-16, C1-12, C1-8, or C1-4 alkylene group or alkylidene group, unless otherwise described. The alkylene group and alkylidene group may be linear, branched, or cyclic, and if necessary, may be optionally substituted with one or more substituents.

Throughout the specification, as the substituent with which the aliphatic compound, alicyclic compound, aromatic compound, alkyl group, alkoxy group, aryl group, alkylene group, alkylidene group, etc. may be optionally substituted, a halogen such as chlorine, fluorine, etc., an epoxy group such as a glycidyl group, an epoxyalkyl group, a glycidoxyalkyl group, alicyclic epoxy group, etc., and an acryloyl group, a methacryloyl group, an isocyanate group, a thiol group, an alkyl group, an alkoxy group, an aryl group, etc. may be mentioned, but is not limited thereto.

Meanwhile, in Chemical Formula 1, n means the number of imide repeat units, and it is a number that is equal to or greater than 1. Specifically, n may be 1 or more or 2 or more, and 200 or less, 150 or less, 100 or less, 80 or less, 70 or less, 60 or less, 50 or less, 40 or less, 30 or less, 20 or less, 10 or less, 5 or less.

Particularly, it may be more preferable that the curing agent is a compound of Chemical Formula 1 wherein n is 2 or more or 3 or more, and preferably 2 to 200, because it enables the realization of high thermal stability and heat resistance.

Meanwhile, the compounds represented by Chemical Formula 1 may be synthesized by known synthesis methods of organic compounds, and the specific method is not specifically limited. For example, the compounds represented by Chemical Formula 1 may be formed by dehydration condensation of a dianhydride compound and a diamine compound, etc.

The compounds represented by Chemical Formula 1 are not volatized or decomposed at a high temperature due to a high boiling point, and thus the curability of a resin composition for a brake pad friction material is stably maintained, and a void that may have a negative influence on the properties is not formed during a high temperature processing or curing process.

For example, the decomposition temperature of the compound represented by Chemical Formula 1 may be 300° C. or more, 350° C. or more, 400° C. or more, or 500° C. or more. The decomposition temperature means a temperature at which the decomposition rate of the compounds represented by Chemical Formula 9 is maintained in the range of 10% or less, 5% or less, or 1% or less. The upper limit of the decomposition temperature is not specifically limited, but for example, it may be about 1000° C. or less.

The compounds represented by Chemical Formula 1 can easily control the process window of the resin composition for a brake pad friction material itself, that is, a difference between the melting temperature and the curing temperature of the resin composition for a brake pad friction material, by the selection of the core M or linker $X^1$ or $X^2$, and thus acts as a curing agent with various properties according to the use.

As explained above, the resin binder is formed by curing of a compound containing the phthalonitrile compound by the curing agent, and the curing agent may be used at a ratio of 0.02 to 1.5 moles, based on 1 mole of the phthalonitrile compound.

It is preferable that the curing agent is used in an amount of 0.02 moles per 1 mole of the phthalonitrile compound, so that the phthalonitrile compound may be sufficiently cured to form a resin binder. However, if the curing agent is excessively used, the process window of a resin composition for a brake pad friction material including the resin binder may become narrow, and thus it is preferable that the curing agent is used in an amount of 1.5 moles per 1 mole of the phthalonitrile compound.

Further, the content of the resin binder may vary according to the contents of the abrasive particles and fillers, the kind of friction subject material, etc., and preferably, it may be 5 to 30 wt %, based on the total weight of the resin composition for a brake pad friction material. Specifically, the resin binder may be included in an amount of 5 wt % or more, 10 wt % or more, 15 wt % or more, or 20 wt % or more, and 30 wt % or less or 25 wt % or less, based on the total weight of the resin composition for a brake pad friction material.

It is preferable that the content of the resin binder is 5 wt % or more, so that the brake pad friction material may exhibit desired heat resistance, and simultaneously, the strength of the friction material may be improved, and the additives may be sufficiently bound to the brake pad friction material. However, if the resin binder is excessively added, friction resistance may become low, thus deteriorating the friction performance of a brake pad, and thus it is preferable that the resin binder is included in the content of 30 wt % or less.

Meanwhile, the resin composition for a brake pad friction material may include additives that are well known in the technical field to which the present invention pertains, without specific limitations.

Preferably, the resin composition for a brake pad friction material includes a reinforcing fiber, a filler, an abrasive, and a lubricant as the additives.

As the reinforcing fiber, filler, abrasive, and lubricant, those that are well known in the technical field to which the present invention pertains may be used without specific limitations. The specific kinds of the reinforcing fiber, filler, abrasive, and lubricant may be appropriately controlled according to the properties required in the brake pad friction material.

For example, the reinforcing fiber may be one or more selected from the group consisting of metal fiber, carbon fiber, glass fiber, aramid fiber, potassium titanate fiber, celluloid fiber, sepiolite fiber, ceramic fiber, and acryl fiber.

The content of the reinforcing fiber may be 15 to 45 wt %, based on the total weight of the resin composition for a brake pad friction material, according to the aimed reinforcing properties.

Specifically, the reinforcing fiber may be included in the content of 15 wt % or more, 20 wt % or more, or 25 wt % or more, and 45 wt % or less, 40 wt % or less, 35 wt % or less, or 30 wt % or less, based on the total weight of the resin composition for a brake pad friction material. It is preferable that the content of the reinforcing fiber may be 15 wt % or more so as to improve the strength of friction material and sufficiently exhibit the reinforcing effect with a binder. However, if the reinforcing fiber is excessively added, a reinforcing fiber that is not bound with a binder may be easily detached at a high temperature, and the frequency of brake noise generation may be increased, thus deteriorating the friction performance of a brake pad, and thus it is preferable that the reinforcing fiber is included in the content of 45 wt % or less.

The filler may be one or more compounds selected from the group consisting of barium sulfate and calcium carbonate, but is not limited thereto.

The content of the filler may be 10 to 40 wt %, based on the total weight of the resin composition for a brake pad friction material, so as to obtain the desired properties such as cost reduction and increase in the density of the friction material, while maintaining the basic properties of the brake pad material such as rigidity, compressive strength, flexural modulus, abrasion resistance, thermal conductivity, malleability, etc.

Specifically, the filler may be included in the content of 10 wt % or more or 15 wt % or more, and 40 wt % or less or 35 wt % or less, based on the total weight of the resin composition for a brake pad friction material. If the filler is insufficiently added, the density of the friction material may decrease, thus lowering abrasion resistance, and thus it is preferable that the content of the filler is 10 wt % or more so as to sufficiently achieve the effect of filling. However, if the filler is excessively added, the friction performance of a brake pad may be deteriorated, or filler that is not bound with a binder may be easily detached from the surface of the brake pad friction material, and thus it is preferable that the filler is included in the content of 40 wt % or less.

The abrasive may be one or more compounds selected from the group consisting of zirconia, alumina, zirconium silicate, and silicon carbide, but is not limited thereto.

The content of the abrasive may be 5 to 20 wt %, based on the total weight of the resin composition for a brake pad friction material, according to the friction properties to be afforded to the brake pad friction material.

Specifically, the abrasive may be included in the content of 5 wt % or more or 10 wt % or more, and 20 wt % or less or 15 wt % or less, based on the total weight of the resin composition for a brake pad friction material. It is preferable that the content of the abrasive is 5 wt % or more so as to control the friction force of the brake pad friction material and sufficiently achieve the removal of a thermally deformed friction film on the surface of a brake disc. However, if the abrasive is excessively added, a brake disc may be excessively abraded to increase torque amplitude and increase the generation frequency of vibration and noise such as judder, thus deteriorating the brake performance, and thus it is preferable that the abrasive is included in the content of 20 wt % or less.

The lubricant may be one or more compounds selected from the group consisting of graphite, cokes, antimony oxide, molybdenum sulfide, hexagonal boron nitride, graphene, carbon nanotubes, and metal sulfides, but is not limited thereto.

The content of the lubricant may be 5 to 30 wt %, based on the total weight of the resin composition for a brake pad friction material, according to the lubricating property to be afforded to the brake pad friction material. Specifically, the lubricant may be included in the content of 5 wt % or more, 10 wt % or more, or 15 wt % or more, and 30 wt % or less, 25 wt % or less, or 20 wt % or less, based on the total weight of the resin composition for a brake pad friction material. It is preferable that the content of the lubricant is 5 wt % or more so as to realize a lubricating effect through the formation of an appropriate friction film. However, if the lubricant is excessively added, the friction performance of a brake pad may be deteriorated, and thus it is preferable that the lubricant is included in the content of 30 wt % or less.

The resin composition for a brake pad friction material may further include a carbon composite material, a metal alloy, a sintered alloy, a friction modifier, etc. as the additives. For example, as the friction modifier, organic fillers such as cashew dust, rubber dust, unvulcanized rubber particles, vulcanized rubber particles, etc. may be applied.

II. Brake Pad Friction Material

According to another embodiment of the invention, a brake pad friction material made of the above-explained resin composition for a brake pad friction material is provided.

Particularly, since the brake pad friction material is made of the above-explained resin composition for a brake pad friction material, thermal decomposition or thermal damage of the brake pad friction material due to frictional heat during the operation process of a brake may be minimized, and thus improved durability and lifespan can be exhibited, and stable brake performance can be secured.

The brake pad friction material may be prepared by a method that is well known in the technical field to which the present invention pertains, using the above-explained resin composition for a brake pad friction material.

For example, among the components of the resin composition for a brake pad friction material, the reinforcing fiber, filler, abrasive, and lubricant are uniformly mixed, and then the resin binder is added under predetermined temperature and pressure conditions to prepare a kneaded mixture. The mixture is pre-molded under the predetermined temperature and pressure conditions, and then dried and pre-heated to form a pre-molded product. Subsequently, the pre-molded product is molded in the form of a pad under predetermined temperature and pressure conditions to form a pressure molded product. The pressure molded product is then heat treated at a predetermined temperature to prepare the final product of brake pad friction material.

The resin composition for a brake pad friction material according to the present invention has high heat resistance and excellent processability, and thus enables the preparation of a brake pad friction material that is capable of securing improved durability and stable brake performance

EXAMPLES

Hereinafter, preferable examples are presented for better understanding of the present invention. However, these examples are presented only as illustrations of the present invention, and the scope of the present invention is not limited thereby.

Preparation Example 1. Synthesis of a Phthalonitrile Compound (PN1)

A compound of the following Chemical Formula 11 (PN1) was synthesized as follows.

32.7 g of a compound of the following Chemical Formula 12 and 120 g of DMF (dimethyl formamide) were introduced into a 3-neck round-bottom flask, and stirred at room temperature for dissolution. Subsequently, 51.9 g of a compound of the following Chemical Formula 13 was added, and 50 g of DMF was added, and then the mixture was stirred for dissolution. Then, 62.2 g of potassium carbonate and 50 g of DMF were introduced together, and the temperature was raised to 85° C. while stirring. After reacting for about 5 hours, the solution was cooled to room temperature.

Figure 1:
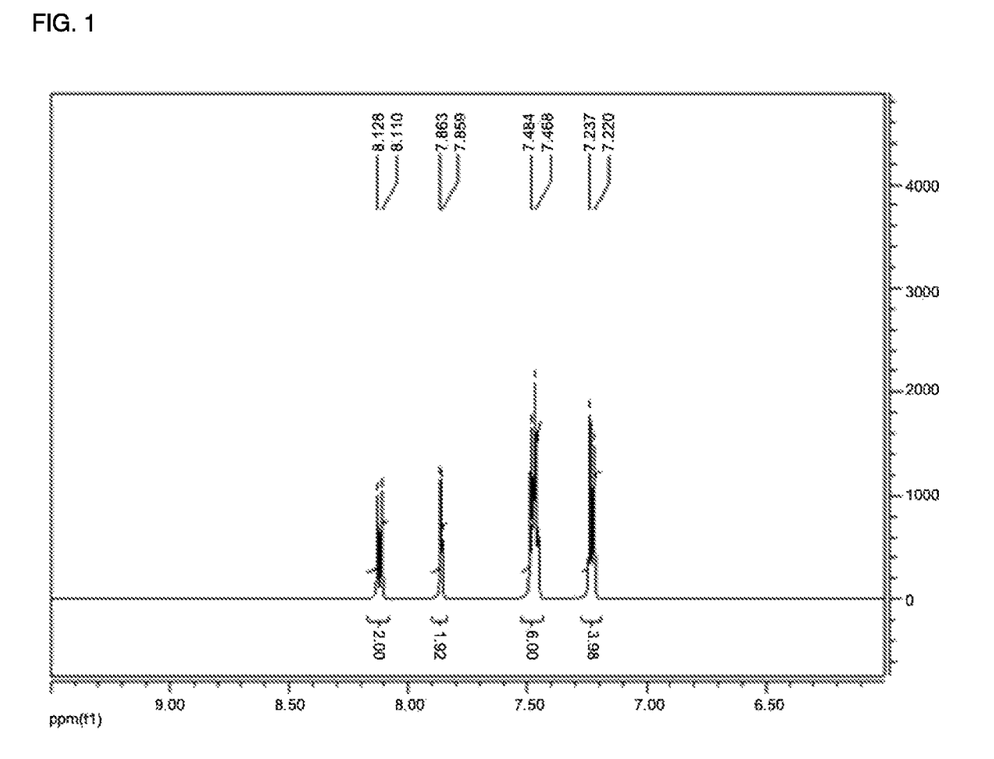
FIG. 1 shows a $^1$H-NMR spectrum of the compound (PN1) according to Preparation Example 1 of the present invention.

The cooled reaction solution was poured into an aqueous solution of 0.2 N hydrochloric acid to neutralize and precipitate it, and after filtering, the reactant was washed with water. Thereafter, the filtered reactant was dried in a vacuum oven at 100° C. for a day, such that water and remaining solvents were removed, and then the compound of the following Chemical Formula 11 (PN1) was obtained with a yield of about 80 wt %. The $^1$H-NMR analysis results for the obtained compound of Chemical Formula 11 (PN1) are shown in FIG. 1.

[Chemical Formula 11]

[Chemical Formula 12]

[Chemical Formula 13]

[Chemical Formula 14]

Preparation Example 2. Synthesis of a Phthalonitrile Compound (PN2)

A compound of the following Chemical Formula 14 (PN2) was synthesized as follows.

28.0 g of 4,4'-bis(hydroxyphenyl)methane and 150 mL of DMF (dimethyl formamide) were introduced into a 500 mL 3-neck round-bottom flask, and stirred at room temperature for dissolution. Subsequently, 48.5 g of 4-nitrophthalonitrile was added, and 50 g of DMF was added, and then the mixture was stirred for dissolution. Subsequently, 58.1 g of potassium carbonate and 50 g of DMF were introduced together, and the temperature was raised to 85° C. while stirring. After reacting for about 5 hours, the solution was cooled to room temperature.

Figure 2:
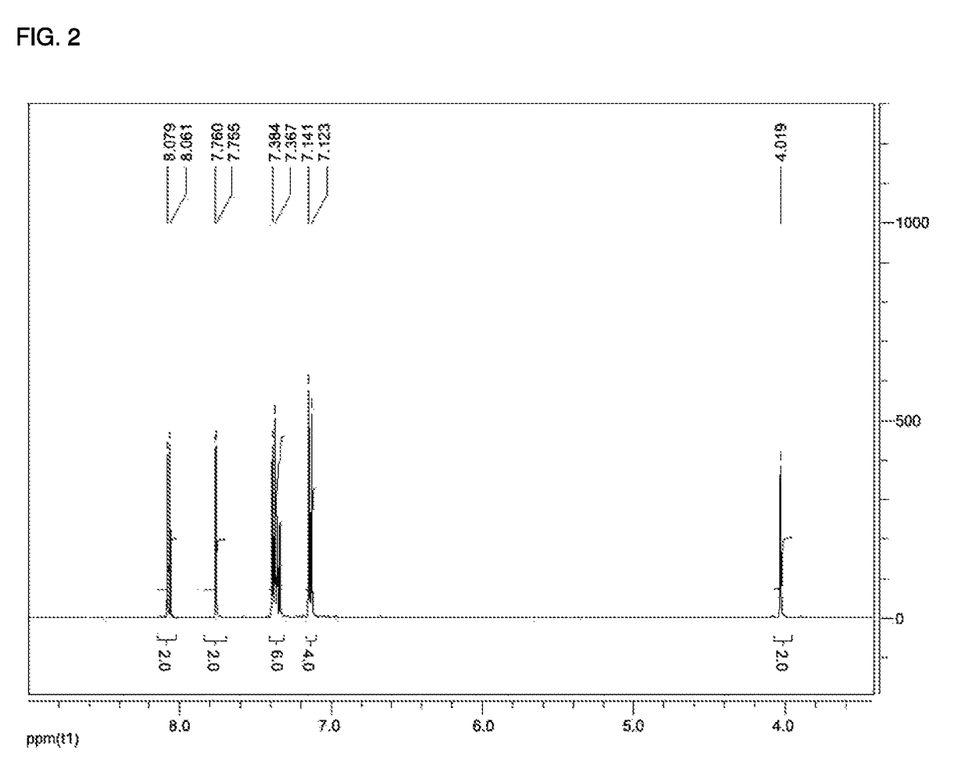
FIG. 2 shows a $^1$H-NMR spectrum of the compound (PN2) according to Preparation Example 2 of the present invention.

The cooled reaction solution was poured into an aqueous solution of 0.2 N hydrochloric acid to neutralize and precipitate it, and after filtering, it was washed with water. Thereafter, the filtered reactant was dried in a vacuum oven at 100° C. for a day, such that water and remaining solvents were removed, and then the target compound (PN2) was obtained with a yield of about 83 wt %. The $^1$H-NMR analysis results for the obtained compound of Chemical Formula 14 (PN2) are shown in FIG. 2.

Preparation Example 3. Synthesis of a Curing Agent Compound (CA1)

A compound of the following Chemical Formula 15 (CA1) was synthesized by dehydrogenation condensation of diamine and dianhydride.

24 g of 4,4'-oxydianiline and 40 g of NMP (N-methylpyrrolidone were introduced into a 3-neck round-bottom flask, and stirred at room temperature for dissolution. The solution was cooled with a water bath, and 8.7 g of a compound of the following Chemical Formula 16 was divided into three parts and gradually introduced together with 40 g of NMP. When the introduced compounds were completely dissolved, 16 g of toluene was added to the reactant to form an azeotrope. A Dean-Stark apparatus and a reflux condenser were installed, and the Dean-Stark apparatus was filled with toluene. 4.2 mL of pyridine was introduced as a dehydrogenation condensation catalyst, the temperature was raised to 170° C., and the solution was stirred for 3 hours. While removing water generated with the formation of an imide ring with the Dean-Stark apparatus, the solution was additionally stirred for 2 hours, and the remaining toluene and pyridine were removed.

Figure 3:
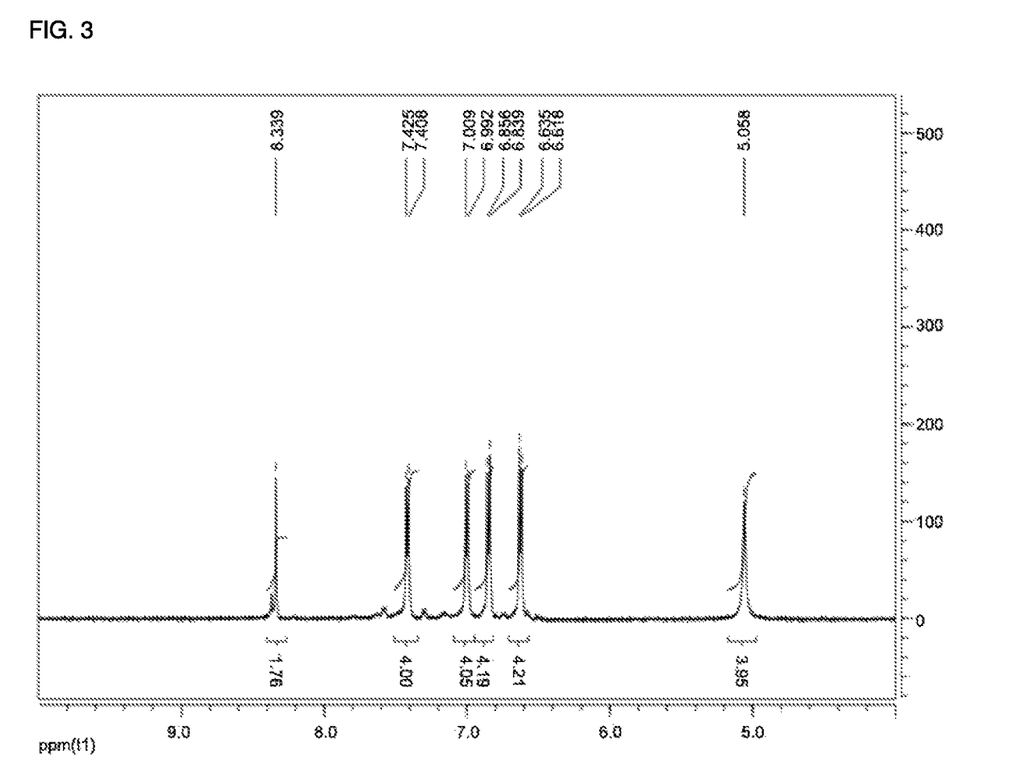
FIG. 3 shows a $^1$H-NMR spectrum of the compound (CA1) according to Preparation Example 3 of the present invention.

The reaction product was cooled to room temperature, and precipitated in methanol to recover it. The recovered precipitate was extracted with methanol to remove remaining reactants, and dried in a vacuum oven to obtain a compound of Chemical Formula 15 (CA1) with a yield of about 85 wt %. The $^1$H-NMR analysis results of the obtained compound of Chemical Formula 15 (CA1) are shown in FIG. 3.

[Chemical Formula 15]

[Chemical Formula 16]

Preparation Example 4. Synthesis of a Curing Agent Compound (CA2)

A compound of the following Chemical Formula 17 (CA2) was synthesized by dehydrogenation condensation of diamine and dianhydride.

8.1 g of m-phenylene diamine and 50 g of NMP (N-methyl-pyrrolidone) were introduced into a 3-neck round-bottom flask, and stirred at room temperature for dissolution. The solution was cooled with a water bath, and 26 g of a compound of the following Chemical Formula 18 was divided into three parts and gradually introduced together with 60 g of NMP. When the introduced compounds were completely dissolved, 23 g of toluene was added to the reactant to form an azeotrope. A Dean-Stark apparatus and a reflux condenser were installed, and the Dean-Stark apparatus was filled with toluene. 5.2 mL of pyridine was introduced as a dehydrogenation condensation catalyst, the temperature was raised to 170° C., and the solution was stirred for 3 hours. While removing water generated with the formation of an imide ring with the Dean-Stark apparatus, the solution was additionally stirred for 2 hours, and the remaining toluene and pyridine were removed.

Figure 4:
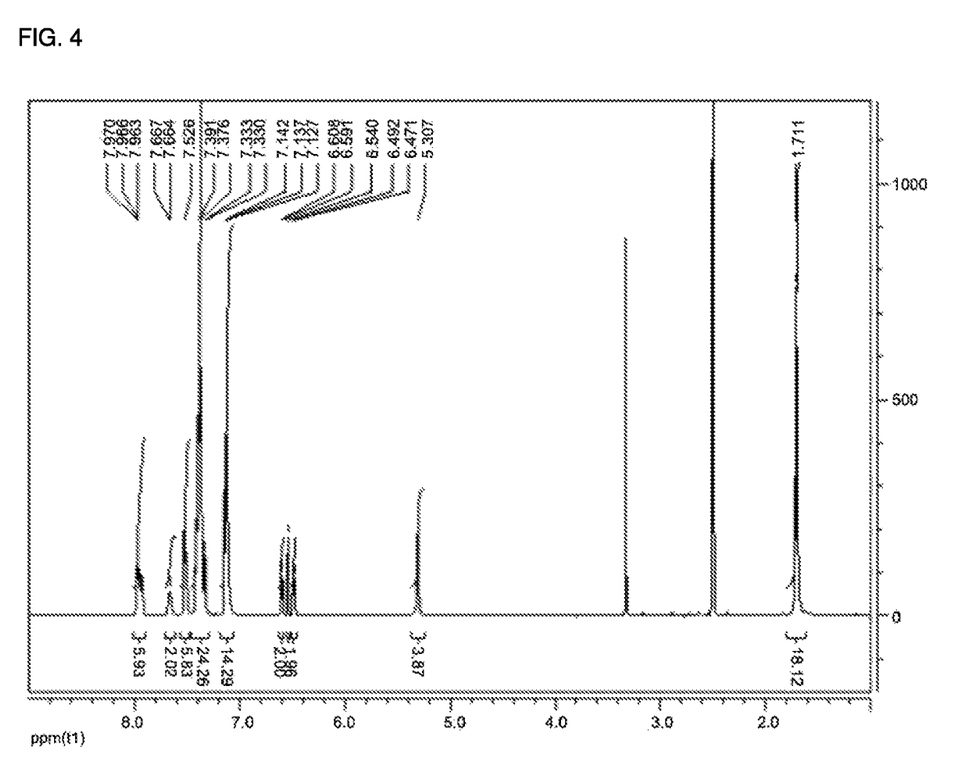
FIG. 4 shows a $^1$H-NMR spectrum of the compound (CA2) according to Preparation Example 4 of the present invention.

The reaction product was cooled to room temperature, and precipitated in methanol to recover it. The recovered precipitate was Soxhlet extracted with methanol to remove remaining reactants, and dried in a vacuum oven to obtain a compound of Chemical Formula 17 (CA2) with a yield of about 93 wt %. The $^1$H-NMR analysis results of the obtained compound of Chemical Formula 17 (CA2) are shown in FIG. 4.

[Chemical Formula 17]

In Chemical Formula 17, n is about 3.

[Chemical Formula 18]

Example 1

The phthalonitrile compound (PN1) of Preparation Example 1 and the curing agent (CA1) of Preparation Example 3 were mixed at a ratio of 0.2 moles per 1 mole of the phthalonitrile compound (PN1) to prepare a resin binder.

As a reinforcing fiber, 5 wt % of aramid fiber, 5 wt % of rock wool, and 15 wt % of potassium titanate fiber, as a filler, 25 wt % of barium sulfate, as an abrasive, 15 wt % of zirconia, as a lubricant, 5 wt % of graphite and 10 wt % of molybdenum sulfide, and 20 wt % of the resin binder were introduced into a Lödige mixer, and mixed for 5 minutes to prepare a resin composition for a brake pad friction material.

The resin composition was introduced into a thermoforming mold, and heated and pressure molded under conditions of a molding temperature of 200° C. to 250° C. and a molding pressure of 30 MPa for 5 minutes to obtain a molded product. The molded product was heat treated at 350° C. for 6 hours to cure it, followed by painting, enamelling, and abrading to prepare a test specimen of a brake pad friction material.

Example 2

The phthalonitrile compound (PN1) of Preparation Example 1 and the curing agent (CA2) of Preparation Example 4 were mixed at a ratio of 0.2 moles per 1 mole of the phthalonitrile compound (PN1) to prepare a resin binder.

As a reinforcing fiber, 5 wt % of aramid fiber, 5 wt % of rock wool, and 15 wt % of potassium titanate fiber, as a filler, 25 wt % of barium sulfate, as an abrasive, 15 wt % of zirconia, as a lubricant, 5 wt % of graphite and 10 wt % of molybdenum sulfide, and 20 wt % of the resin binder were introduced into a Lödige mixer, and mixed for 5 minutes to prepare a resin composition for a brake pad friction material.

A test specimen of the brake pad friction material was prepared using the resin composition by the same method as in Example 1.

Example 3

The phthalonitrile compound (PN2) of Preparation Example 2 and the curing agent (CA1) of Preparation Example 3 were mixed at a ratio of 0.2 moles per 1 mole of the phthalonitrile compound (PN2) to prepare a resin binder.

As a reinforcing fiber, 5 wt % of aramid fiber, 5 wt % of rock wool, and 15 wt % of potassium titanate fiber, as a filler, 25 wt % of barium sulfate, as an abrasive, 15 wt % of zirconia, as a lubricant, 5 wt % of graphite and 10 wt % of molybdenum sulfide, and 20 wt % of the resin binder were introduced into a Lödige mixer, and mixed for 5 minutes to prepare a resin composition for a brake pad friction material.

A test specimen of the brake pad friction material was prepared using the resin composition by the same method as in Example 1.

Example 4

The phthalonitrile compound (PN2) of Preparation Example 2 and the curing agent (CA2) of Preparation Example 4 were mixed at a ratio of 0.2 moles per 1 mole of the phthalonitrile compound (PN2) to prepare a resin binder.

As a reinforcing fiber, 5 wt % of aramid fiber, 5 wt % of rock wool, and 15 wt % of potassium titanate fiber,
- as a filler, 25 wt % of barium sulfate,
- as an abrasive, 15 wt % of zirconia,
- as a lubricant, 5 wt % of graphite and 10 wt % of molybdenum sulfide, and
- 20 wt % of the resin binder were introduced into a Lödige mixer, and mixed for 5 minutes to prepare a resin composition for a brake pad friction material.

A test specimen of the brake pad friction material was prepared using the resin composition by the same method as in Example 1.

Comparative Example 1

As a reinforcing fiber, 5 wt % of aramid fiber, 5 wt % of rock wool, and 15 wt % of potassium titanate fiber,
- as a filler, 25 wt % of barium sulfate,
- as an abrasive, 15 wt % of zirconia,
- as a lubricant, 5 wt % of graphite and 10 wt % of molybdenum sulfide, and
- as resin binder, 20 wt % of phenol resin of a straight structure were mixed to prepare a resin composition.

A test specimen of the brake pad friction material was prepared using the resin composition by the same method as in Example 1.

Comparative Example 2

As a reinforcing fiber, 5 wt % of aramid fiber, 5 wt % of rock wool, and 15 wt % of potassium titanate fiber,
- as a filler, 25 wt % of barium sulfate,
- as an abrasive, 15 wt % of zirconia,
- as a lubricant, 5 wt % of graphite and 10 wt % of molybdenum sulfide, and
- as resin binder, 20 wt % of polyimide resin were mixed to prepare a resin composition.

The resin composition was introduced into a thermoforming mold, and heated and pressure molded for 3 hours with repeated pressurization and pressure reduction under molding pressure of 30 MPa while raising the temperature to 250° C. to 300° C., thus obtaining a molded product. The molded product was heat treated at 350° C. for 3 hours to cure it, followed by painting, enamelling, and abrading to prepare a test specimen of a brake pad friction material.

Experimental Example 1. NMR Analysis

For the PN1, PN2, CA1, and CA2 compounds obtained in Preparation Examples 1 to 4, $^1$H-NMR analysis was conducted according to the manual of the manufacturing company using 500 MHz NMR equipment of Agilent Inc. The sample for NMR measurement was prepared by dissolving the compound in DMSO (dimethyl sulfoxide)-d6. The $^1$H-NMR analysis results of each compound are shown in FIGS. 1 to 4.

Experimental Example 2. Evaluation of Thermal Stability

The thermal stability (degree of thermal decomposition) of the test specimen of the brake pad friction material was evaluated by TGA (thermogravimetric analysis), and the results are shown in the following Table 1.

Specifically, the analysis was conducted using TGA e850 equipment of Mettler-Toledo Company, and it was conducted under a $N_2$ flow condition while raising the temperature from about 25° C. to 800° C. at a speed of 10° C./min.

Experimental Example 3. Evaluation of Heat Resistance

The heat resistance of the resin binder for a brake pad friction material was evaluated through HDT (heat deflection temperature) measurement, and the results are shown in the following Table 1.

Specifically, the heat resistance was measured according to the test method of the ASTM D648-16 (Method B) standard.

Experimental Example 4. Evaluation of Anti-Fade Property

The brake pad friction material was applied for an automobile brake, and the braking performance and anti-fade property were evaluated and compared, and the results are shown in the following Table 1.

Specifically, for the evaluation of the braking performance, a dynamometer test was conducted according to the officially approved test method of JASO C406, and the average coefficient of friction under basic performance conditions of a brake (vehicular speed: 50 km/h, deceleration: 0.1~0.6 G) and high speed performance conditions of a brake (vehicular speed: 100 km/h, deceleration: 0.5 G), and the minimum coefficient of friction during the high temperature performance test were compared. Further, for the measurement of the anti-fade property, in the braking performance test, the average coefficient of friction and the coefficient of friction decreased by fading during high speed performance test (fade amount=average coefficient of friction−minimum coefficient of friction) were compared.

Experimental Example 5. Evaluation of High Temperature Abrasion Resistance

The brake pad friction material was applied for an automobile brake and high temperature abrasion resistance according to braking was compared, and the results are shown in the following Table 1.

Specifically, an abrasion test was conducted using a Krauss type of friction tester, and the braking distance of 25 km was progressed while maintaining a pressure of 7 kgf/cm$^2$ and a brake disc temperature of 350° C., thus evaluating abrasion resistance at a high temperature. Further, for the measurement of abrasion resistance, the thicknesses of the brake friction material before and after a braking test were compared.

TABLE 1

|  | Thermal stability Td10 % | Heat resistance HDT (1.8 MPa) | Braking performance | |
|---|---|---|---|---|
|  |  |  | Anti-fade property (fade amount) | High temperature abrasion resistance (abrasion amount, mm) |
| Example 1 | 501 | 380 | 0.04 | 0.15 |
| Example 2 | 407 | 400 | 0.04 | 0.15 |

TABLE 1-continued

| | | | Braking performance | |
|---|---|---|---|---|
| | Thermal stability Td10 % | Heat resistance HDT (1.8 MPa) | Anti-fade property (fade amount) | High temperature abrasion resistance (abrasion amount, mm) |
| Example 3 | 524 | 430 | 0.04 | 0.16 |
| Example 4 | 520 | 440 | 0.03 | 0.16 |
| Comparative Example 1 | 370 | 155 | 0.11 | 0.18 |
| Comparative Example 2 | 602 | 480 | 0.03 | 0.21 |

According to Experimental Examples 1 to 5, it was confirmed that the test specimens of the brake pad friction materials of Examples 1 to 4 have relatively high heat resistance compared to the test specimen of Comparative Example 1, and simultaneously, exhibit improved durability and stable brake performance. In addition, the test specimens of the brake pad friction materials of Examples 1 to 4 exhibit higher productivity because they can be easily prepared, compared to the test specimen of Comparative Example 2.

The invention claimed is:

1. A resin composition material comprising a resin binder cured from a composition containing a phthalonitrile compound, reinforcing fiber, a filler, an abrasive, and a lubricant, wherein the resin binder containing a phthalonitrile compound is cured by one or more curing agents, and wherein the curing agent is a compound represented by the following Chemical Formula 1:

Chemical Formula 1 wherein, in Chemical Formula 1,

M is a tetravalent radical derived from an aliphatic, alicyclic, or aromatic compound, each of $X^1$ and $X^2$ is independently an alkylene group, an alkylidene group, or a divalent radical derived from an aromatic compound, and n is a number that is equal to or greater than 1.

2. The resin composition according to claim 1, wherein the curing agent is a compound of Chemical Formula 1 in which n is a number in a range of 2 to 200.

3. The resin composition according to claim 1, wherein the reinforcing fiber comprises one or more selected from the group consisting of metal fiber, carbon fiber, glass fiber, aramid fiber, potassium titanate fiber, celluloid fiber, sepiolite fiber, ceramic fiber, and acryl fiber.

4. The resin composition according to claim 1, wherein the filler comprises one or more selected from the group consisting of barium sulfate and calcium carbonate.

5. The resin composition according to claim 1, wherein the abrasive comprises one or more selected from the group consisting of zirconia, alumina, zirconium silicate, and silicon carbide.

6. The resin composition according to claim 1, wherein the lubricant comprises one or more selected from the group consisting of graphite, cokes, antimony oxide, molybdenum sulfide, hexagonal boron nitride, graphene, carbon nanotubes, and metal sulfide.

7. The resin composition according to claim 1, wherein the composition comprises 5 to 30 wt % of the resin binder, 15 to 45 wt % of the reinforcing fiber, 10 to 40 wt % of the filler, 5 to 20 wt % of the abrasive, and 5 to 30 wt % of the lubricant.

8. A brake pad friction material made of the resin composition, wherein the resin composition material comprises a resin binder cured from a composition containing a phthalonitrile compound, reinforcing fiber, a filler, an abrasive, and a lubricant.

* * * * *